United States Patent [19]

Mori

[11] 4,441,841
[45] Apr. 10, 1984

[54] THROW AWAY INSERT

[75] Inventor: Yoshikatsu Mori, Itami, Japan

[73] Assignee: Sumitomo Electric Industries, Ltd., Osaka, Japan

[21] Appl. No.: 344,931

[22] Filed: Feb. 2, 1982

Related U.S. Application Data

[63] Continuation of Ser. No. 242,903, Mar. 12, 1981, abandoned, which is a continuation of Ser. No. 81,259, Oct. 2, 1979, abandoned.

[30] Foreign Application Priority Data

Nov. 6, 1978 [JP] Japan .................................. 53-138523

[51] Int. Cl.$^3$ ............................................. B26D 1/00
[52] U.S. Cl. .................................... 407/114; 407/116
[58] Field of Search ........................ 407/114, 115, 116

[56] References Cited

U.S. PATENT DOCUMENTS

| | | | |
|---|---|---|---|
| 3,187,406 | 6/1965 | Franko | 407/114 |
| 3,381,349 | 5/1968 | Newcomer | 407/114 |
| 3,395,434 | 8/1968 | Wirfelt | 407/114 |
| 3,792,514 | 2/1974 | Ushijima | 407/115 |
| 3,815,192 | 6/1974 | Uhtsu et al. | 407/114 |
| 3,885,281 | 5/1975 | Stambler | 407/114 |
| 3,947,937 | 4/1976 | Hertel | 407/114 |
| 4,304,509 | 12/1981 | Mori | 407/114 |

FOREIGN PATENT DOCUMENTS 52-98885 7/1977 Japan .................................. 407/114

Primary Examiner—Leonidas Vlachos
Assistant Examiner—Jerry Kearns
Attorney, Agent, or Firm—Wenderoth, Lind & Ponack

[57] ABSTRACT

An improved throw away insert for a boring tool has a recess at each corner, a small chip breaking projection formed in said recess and a large chip breaking projection formed in the center of the top surface of the insert to control the chip during cutting for large depths of cut.

1 Claim, 10 Drawing Figures

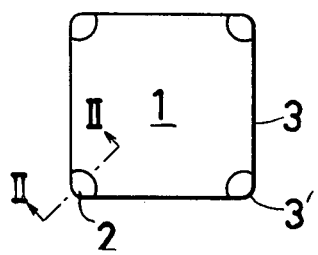
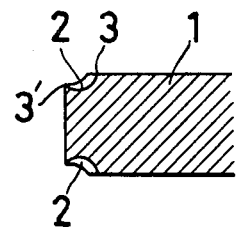
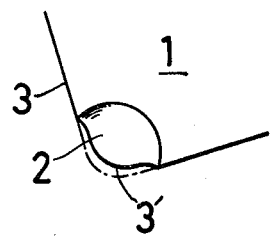
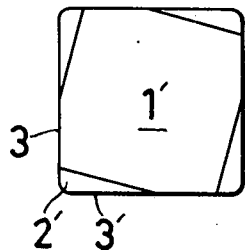
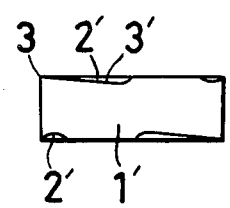
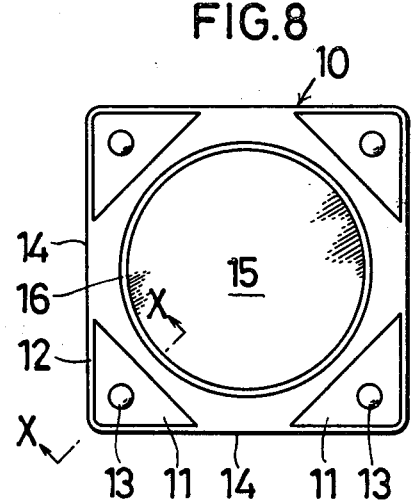
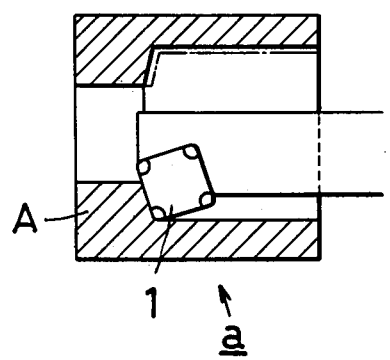
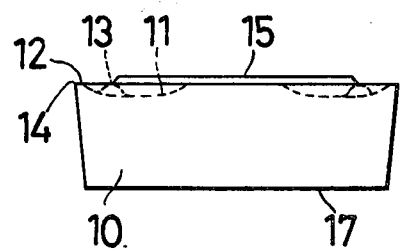
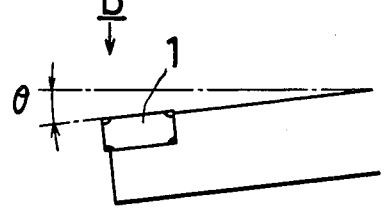
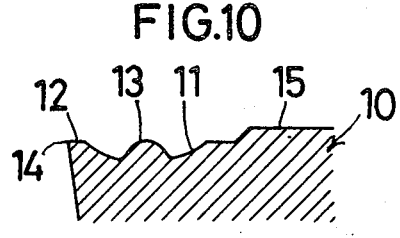

THROW AWAY INSERT

This application is a continuation of Ser. No. 242,903, filed Mar. 12, 1981, and now abandoned, which in turn is a continuation of Ser. No. 81,259, filed Oct. 2, 1979, now abandoned.

The present invention relates to a throw away insert for a boring machine or tool.

The conventional throw away inserts for boring machine have shortcomings in that they leave irregular cutting marks on the workpiece when used with the rake face inclined and that they cannot break a chip well for large depths of cut.

An object of the present invention is to provide a throw away insert which ensures a good cutting finish.

Another object of the present invention is to provide a throw away insert which can break a chip satisfactorily even for large depths of cut.

Other objects and advantages of the present invention will become apparent from the following description taken with reference to the accompanying drawings:

FIG. 1 is a plan view of a conventional throw away insert;

FIG. 2 is an enlarged sectional view taken along the line II—II of FIG. 1;

FIG. 3 is a plan view of another conventional throw away insert;

FIG. 4 is a front elevational view thereof;

FIG. 5 is a horizontal sectional plan view showing how the insert of FIG. 1 is used in a boring machine;

FIG. 6 is a view of the insert and the holder as viewed from the direction a of FIG. 5;

FIG. 7 is an enlarged view as viewed from the direction b of FIG. 6;

FIG. 8 is a plan view of the throw away insert according to the present invention;

FIG. 9 is a front elevational view thereof; and

FIG. 10 is an enlarged sectional view thereof taken along the line X—X of FIG. 8.

Referring first to FIGS. 1 and 2, a conventional insert 1 is illustrated which has a recess 2 at each corner to serve as a chip control breaker. Since the recess 2 is formed by gouging off part of each corner, there is a difference in level between the straight cutting edge 3 and the cutting edge 3' at the corner as will be seen in FIG. 2.

The recess 2 functions satisfactorily to break the chip when cutting at small depths of cut (approximately 2 mm), but cannot control the chip so well for larger depths of cut.

In boring a workpiece A with a shouldered hole as shown in FIG. 5, the insert 1 is positioned on the rotating tool shaft with its rake face inclined at an angle $\theta$ as will be seen in FIG. 6. In this condition, as will be seen from FIG. 7, the cutting edge 3' at each corner looks wavy when viewed from above. Therefore, after cutting, a similar wavy mark is left on the work at the portion cut by the cutting edge. This impairs the quality of the work. This difficulty is caused due to the above-mentioned difference in level between the cutting edge 3 and 3'.

FIGS. 3 and 4 illustrate another example of a conventional throw away insert 1'. It is formed with an acute-angled triangular recess 2' at each corner for chip breaking. This insert 1' permits cutting with larger depths of cut than the above-described insert 1. For the larger depths of cut, however, the difference in level between the cutting edge 3 and the cutting edge 3' gradually becomes larger. This poses the same difficulty as with the insert 1 when it is used with its rake face inclined. Further, this conventional insert has another shortcoming, namely that it cannot be employed for both right-hand and left-hand use.

A preferred embodiment of the present invention will be described below with reference to FIG. 8 to FIG. 10.

A throw away insert generally designated by numeral 10 is a square insert of the positive rake type which has two opposite, parallel surfaces and a plurality of sides, a cutting edge 14 being formed along a line where each of said sides joint the upper surface. The insert 10 has a triangular recess 11 at each corner thereof inside of a land 12 extending along the cutting edge. Substantially in the center of each recess 11 is provided a small projection 13 of substantially the same height as the land 12.

As will be best seen from FIG. 10, the small projection 13 is disposed at the bottom of the recess 11 to serve as a chip breaker.

A large round projection 15 is provided in the center of the insert 10. The outer periphery of the large projection 15 runs substantially along each side of the cutting edge 14 e.g. at 16. The large projection 15 has the top surface thereof slightly above the cutting edge 14 and thus above the small projection 13 and this top surface is flat and parallel with the flat bottom surface of the insert 17.

For ordinary throw away inserts, the large projection 15 has a diameter which is about 1–5 mm smaller than that of an imaginary circle inscribed in the insert 10 and has a height 0.1–0.8 mm above the level of the cutting edge 14. Since the large projection 15 is higher than the small projection 13, it serves as a chip breaker when the depth of cut is relatively large. The large projection does not necessarily have to be circular.

Although the preferred embodiment is a square insert of a positive type without a mounting hole in the center, the present invention may be applied to other types of inserts such as triangular inserts, negative type inserts or inserts with a mounting hole.

Due to the fact that the insert according to this invention has a small projection in the recess formed at each corner thereof, it has a chip breaking capability yet there is no difference in the level of the cutting edge. Therefore, even if it is used with the rake face inclined, no irregular cutting marks or traces are left on the work. Also, the large projection ensures chip breaking for larger depths of cuts. Further, because of its symmetrical shape, the insert according to this invention may be used for both right-hand and left-hand use.

Although this invention has been described with reference to a preferred embodiment, it will be understood that various changes or modifications may be made within the scope and spirit of the present invention.

What are claimed are:

1. A throw away insert for a boring tool, said insert having a polygonal shape with corners and having two opposite, parallel surfaces and a plurality of sides, a cutting edge formed at the junction of each of said sides with at least one of said surfaces, said one surface having a land extending inside of and along said cutting edge, said insert having a plurality of separate recesses in said one surface inside of said land, one recess at each corner of the insert, a substantially circular first chip breaking projection in the central portion of each recess with a periphery spaced from the edges of the recess, and a second chip breaking projection at the center of said one surface and having the outer periphery thereof extending substantially closer to said cutting edge between each pair of the corners of the insert than at the corners, the top of said first chip breaking projection being below the top of said second chip projection.

* * * * *